Figure 1:
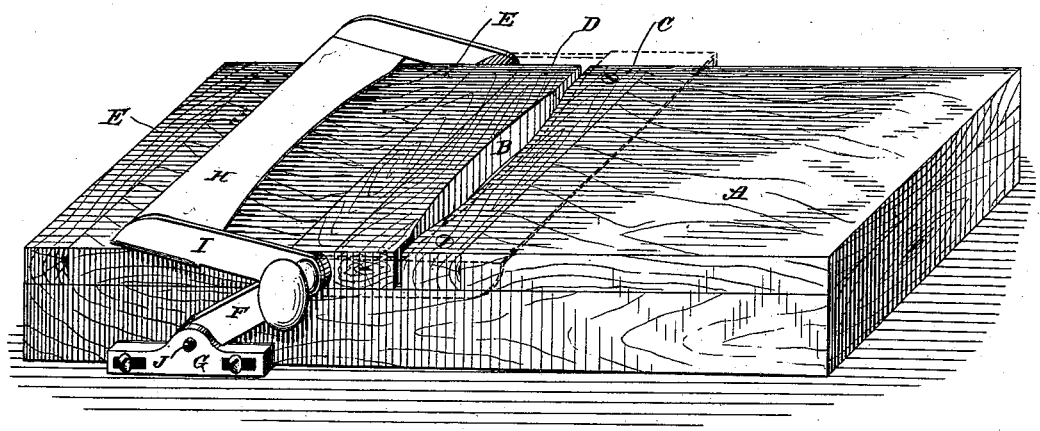

(No Model.) 2 Sheets—Sheet 1.

F. E. KELSEY & G. D. WOODWORTH.
MACHINE FOR BUNCHING CIGARS.

No. 407,733. Patented July 23, 1889.

Witnesses:
Raphaël Netter
Robt. F. Gaylord

Inventors:
Frederick E. Kelsey
and George D. Woodworth
By Duncan Curtis & Page
Attorneys.

(No Model.) 2 Sheets—Sheet 2.

F. E. KELSEY & G. D. WOODWORTH.
MACHINE FOR BUNCHING CIGARS.

No. 407,733. Patented July 23, 1889.

Witnesses:
Raphael Netter
Robt. F. Gayford

Inventors:
Frederick E. Kelsey
and George D. Woodworth,
By
Duncan Curtis & Page
Attorneys.

UNITED STATES PATENT OFFICE.

FREDERICK E. KELSEY, OF NEW YORK, AND GEORGE D. WOODWORTH, OF BROOKLYN, NEW YORK.

MACHINE FOR BUNCHING CIGARS.

SPECIFICATION forming part of Letters Patent No. 407,733, dated July 23, 1889.

Application filed April 15, 1889. Serial No. 307,268. (No model.)

*To all whom it may concern:*

Be it known that we, FREDERICK E. KELSEY, of the city, county, and State of New York, and GEORGE D. WOODWORTH, of Brooklyn, in the county of Kings and State of New York, have invented certain new and useful Improvements in Machines for Bunching Cigars, of which the following is a full, clear, and exact description, reference being had to the accompanying drawings.

The present invention relates to a machine or apparatus by which the filling or body of a cigar may be brought to the proper shape.

As is well understood in the manufacture of cigars wholly by hand, the workman gathers the fillers in his hand and by compressing and packing (generally spoken of as "bunching") he gives such shape to the same as determines the form of the cigar when finally wrapped. This bunch is then wound with a binding-leaf and is ready for the molds, in which it is lightly compressed and uniformly rounded and its shape made permanent previous to receiving the outside wrapper. This bunching of the fillers of cigars is the most important step in their manufacture, as upon it depend the shape of the cigars and their uniformity of size and form. Accordingly only operators of long experience can be trusted to do the bunching, and the expense of such skilled labor is an important part of the cost of the whole manufacture. Furthermore, operators of even average skill cannot produce goods of such uniformity in make as is desired. It is therefore the object of our invention to produce a machine by which the bunching of cigars may be accomplished mechanically, at least so far as concerns the determining of their ultimate form, and by which the shape of the bunches is determined, mainly at least, independently of the skill of the operator.

The invention consists of a mold or matrix shaped to approximately the desired form of the bunch and composed of separable parts, permitting the ready removal of the bunch and the placing in the mold of the binder for the bunch, and a holder by which the free end or ends of the binder is controlled and held in place during the process of filling the mold.

It also consists, in combination with such mold and binder-holder, of a hand-plate having an edge of a form similar to that of the desired outline of the cigars, which plate is employed to force the binder partially around the bunch as it is held by the forming-mold.

Figure 2:
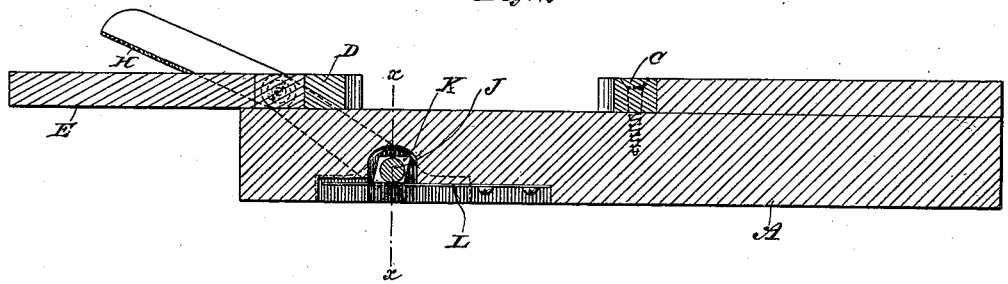
Figure 3:
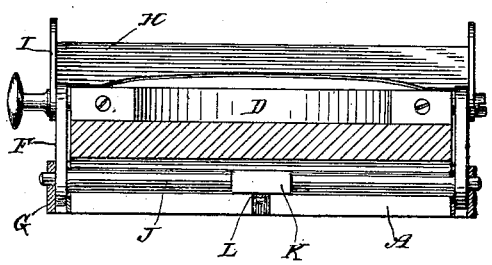
Figure 4:
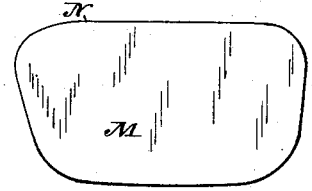
Figure 5:
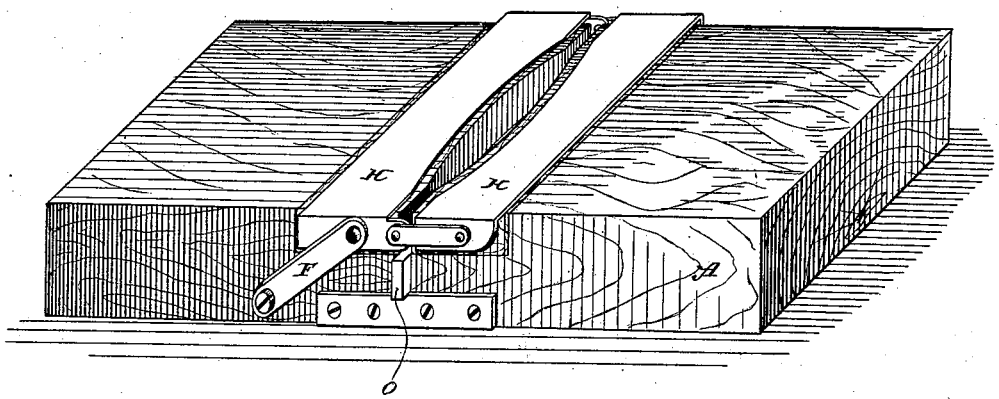
Figure 6:
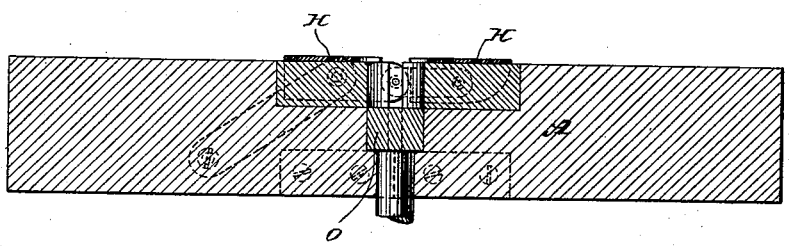
Figure 7:
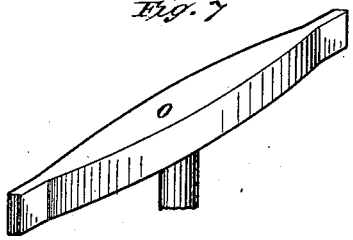

Referring to the drawings, Figure 1 is a perspective view of a bunching-machine embodying my improvements. Fig. 2 is a central longitudinal section of the same with the movable part of the mold thrown back or open. Fig. 3 is a cross-section on the plane *x x*, Fig. 2. Fig. 4 is a plan view of the hand-plate. Fig. 5 is a perspective view of a modified form of the mold and holder. Fig. 6 is a central longitudinal section of the same, and Fig. 7 is a detail view of the movable part of the mold shown in Fig. 5.

Referring to the views in detail, A represents the base of the machine, which may be of wood or any other suitable material. In the top face of this base is formed the mold or matrix B, the side pieces of which C and D are removable for the purpose of substituting other like pieces having differently-shaped faces. The side pieces of this mold and the bottom, if desired, are shaped to substantially the form of a cigar. The piece C is screwed firmly to the base A, while the piece D is screwed to the end of a movable plate or slide E, which lies in the recessed top of the base, with its top face in the same plane as that of the top faces of the mold-piece C and the right-hand end of the base. The slide E is hinged by the link F to the base A, the connection of this link to the base being through the block G, which is adjustably screwed to the base for the purpose of fixing the slide so that the mold-opening will have the required width.

H represents the binder-holder, which is a thin strip or plate of metal pivoted by arms I to the links F where such links are pivoted to the slide E. The edge of this holder is of a shape conforming to that of the mold, and the holder is designed to lie flat on the top of the base, with its curved edge close to the edge of the mold, as shown in dotted lines in Fig. 1. The pivot-rod J of the link F to the block G extends through the base from one side to the other, and upon the side opposite that shown in Fig. 1 there is a second block similar to G, which carries the link-connection on that side of the binder-holder. In the middle of the base the rod J carries a cam K, upon the flat face of which bears a spring L, fixed to the base. When the mold is closed, this spring bears upon one of the flat faces of the cam, and thereby holds the movable slide E in position, so that in filling the mold it will not be pushed away. The spring and cam also serve to assist to return the slide and assure the mold-pieces C and D being always brought to the same relative position.

M is a hand-plate for pushing the free end of the binder down between the side of the mold and the bunch of fillers. One edge N of this plate is curved to nearly the same outline form as the mold, and it may be sufficiently sharp for the plate to serve as a knife.

The operation of the machine is as follows: The machine is placed in front of the operator on a table or other proper support, with the right-hand end of the base, Fig. 1, next him, and the slide is thrown back, as in Fig. 2. The operator now lays the binder or binders upon the top of the base in the space between the separated mold-pieces, with one side thereof extending back and over the mold-piece nearer him. The slide is now returned to closed position, resting upon the side of the binder farther from the operator, and the binder-holder is swung over (Fig. 1, dotted lines) upon the side of the binder nearer the operator. The operator now simply lays the filler-pieces in the mold until it is evenly filled and its contents slightly pressed down, meanwhile resting his hand or fingers upon the binder-holder, which keeps the binder under the proper tension and prevents it being forced into the mold or wrinkled and rolled in with the filler. When the mold is evenly filled, the binder-holder is thrown back, (Fig. 1, full lines,) and the side of the binder thus freed is thrown over the filler and forced down the side of the mold next the slide by the curved edge of the hand-plate. When the binder has been thus passed around the filler or bunch, the slide is thrown back, the operator meanwhile holding the binder in position and the fillers in their molded form by the use of the hand-plate, and then the operator presses upon the bunch with his finger-tips and rolls it toward the slide, thereby wrapping the other side of the binder around the bunch and completing it ready for the finishing-molds, in which it is to be kept under slight pressure until its form has become sufficiently fixed and it is in condition for the outside wrapper.

In Fig. 5 we show a modified form of the machine. Here the sides of the mold are fixed, though being removable for the purpose of putting in differently-shaped pieces; but the bottom of the mold is a vertically-moving follower O, operated by any suitable means, so that it can be pushed up between the sides of the mold and to a position flush with the top thereof. The binder-holder also is double, or there are two holders H H, which are linked together and both pivoted to the base A. With this machine the binder will be laid over the mold with its sides under the two holders, they being then in the position shown in Fig. 5. The fillers will be laid in the mold as before, the front holder will be lifted and thrown over upon the other, and the freed side of the binder will be laid over the top of the bunch and pushed by the hand-plate down the side of the mold and around the bunch. The bunch will now be held by the plate as before, while the rear holder, carrying with it the front holder, is thrown back to the end of the base, and the movable plunger or bottom of the mold is forced up vertically to push the bunch out of the mold, whereupon the bunch may be rolled forward to complete the winding of the other side of the binder around it.

Other modifications are possible and will be suggested to those skilled in this art; but we have shown sufficient to illustrate the principal parts of our invention, which consists, essentially, of a mold in which the fillers can be packed, a part of which mold is movable to permit the removal of the bunched fillers and a holder for retaining the free side or sides of the binder.

What is claimed as new is—

1. In a machine for bunching cigars, the combination, with a mold having separable parts and which is adapted to receive the binder of the bunch and to give the fillers the requisite bunch form, of a holder for retaining the side of the binder while the fillers are being packed in the mold.

2. In a machine for bunching cigars, the combination, with a mold adapted to receive the binder and to give form to the bunch of fillers, of a holder for retaining the ends of the binder while the mold is being filled with the fillers, the mold having separable parts by which it is opened or the bunch removed therefrom.

3. In combination, the base A, the mold B, having the movable side D E, the binder-holder H, and the link F, adjustably securing the movable part of the mold to the base.

4. In combination, the base A, the mold B, the slide E, carrying the mold-piece D, the binder-holder H, link F and its pivot-rod J, and the cam K and spring L.

FREDERICK E. KELSEY.
GEORGE D. WOODWORTH.

Witnesses:
ROBT. F. GAYLORD,
FRANK E. HARTLEY.